H. E. MARSHALL.
HEDGE CUTTER.
APPLICATION FILED JULY 25, 1912.
1,152,531.
Patented Sept. 7, 1915.
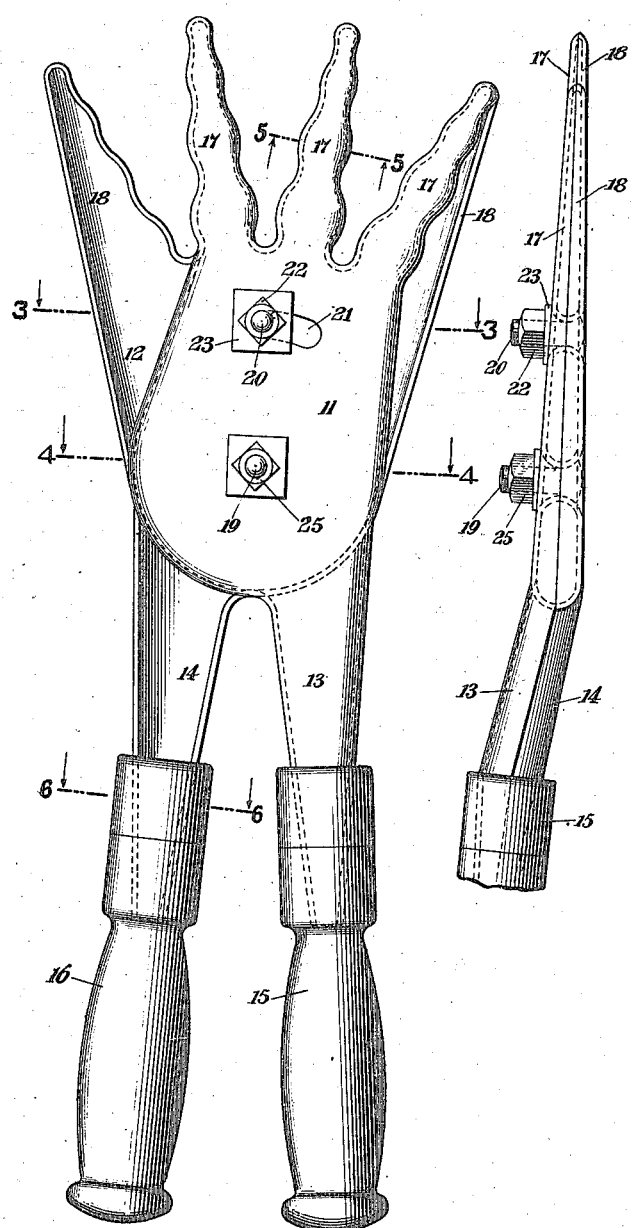
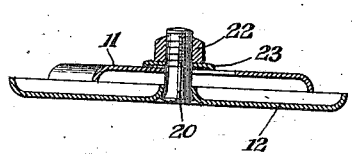
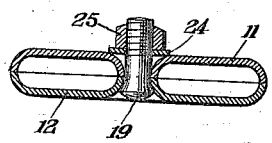
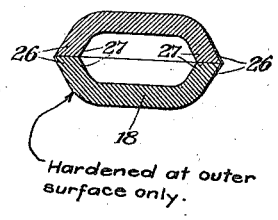
Hardened at outer surface only.
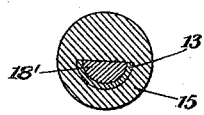
Witnesses:
Inventor
Herbert E. Marshall

UNITED STATES PATENT OFFICE.

HERBERT E. MARSHALL, OF NEW YORK, N. Y.

HEDGE-CUTTER.

1,152,531.　　　　Specification of Letters Patent.　　Patented Sept. 7, 1915.

Application filed July 25, 1912. Serial No. 711,440.

*To all whom it may concern:*

Be it known that I, HERBERT E. MARSHALL, a citizen of the United States, residing at the borough of Brooklyn, city of New York, in the county of Kings and State of New York, have invented certain new and useful Improvements in Hedge-Cutters, of which the following is a specification, reference being had therein to the accompanying drawings, forming part thereof.

My invention relates to hedge cutters and has for its objects to provide a cutter which will be strong, composed of but few parts, simple in construction, inexpensive of manufacture, effective in operation and easy of manipulation.

Another object of my invention is to provide a construction of cutter which will afford an advantage of leverage and at the same time will permit of conveniently and effectively clamping the cutting teeth together.

Another object is to prevent binding by the accumulation of material between the two pivoted members.

Another object is to provide cutting edges for the teeth which will be self-sharpening.

Still other objects and advantages of my invention will appear from the following description.

In carrying out my invention, I provide two body members which are pivoted together, each of which is provided with a rearwardly extending operating handle and with a plurality of cutting teeth at its front end, and between the pivot and the teeth I provide movement-limiting means and an adjustable yielding clamp for clamping the front end of the pivoted members together. The body members and the cutting teeth are concave and are arranged with their concave faces together.

My invention comprehends cutting edges for the teeth having their outer sides harder than their inner sides.

My invention also includes more particularly features of construction and combinations of parts, as will hereinafter more fully appear.

I shall now describe the hedge cutter embodying my invention illustrated in the accompanying drawings and shall thereafter point out my invention in claims.

Figure 1 is a plan or face view of the cutter. Fig. 2 is a side elevation of the same. Fig. 3 is a transverse section of the same on the line 3—3 of Fig. 1, looking down. Fig. 4 is a transverse section of the same on the line 4—4 of Fig. 1, looking down. Fig. 5 is a transverse section on an enlarged scale of two of the coöperating cutting teeth, taken on the line 5—5 of Fig. 1. Fig. 6 is a transverse section through one of the handles taken on the line 6—6 of Fig. 1.

In the illustrated embodiment of my invention, I employ two coöperative body members of sheet metal or other suitable material, an upper body member 11 and a lower body member 12, pivoted together near their rear ends and provided with rearward extensions or operating shanks, 13 and 14, respectively, on their outer sides, to which suitable handles, 15 and 16, respectively, are secured. At their front ends the body members are provided with a plurality of coöperative tapered cutting teeth, or blades, having origin or beginning in spaced relation to the pivot of and forming extensions of the bodies and shown as having cutting edges of scalloped form, the upper body member 11 being provided with three teeth 17 and the lower body member 12 being provided with four teeth 18. All of the teeth or blades 17 and 18 are equally spaced on the body members and are of the same shape and dimensions excepting the outermost teeth of the lower body member 12, these latter teeth being shown as wider at their outer margins and merging by straight lines into the body member. The teeth are so arranged relative to each other that, as the body members are oscillated about their pivot, the upper and lower cutting teeth coöperate with a shearing action.

To provide the necessary strength and rigidity for the parts and at the same time to prevent the parts from binding from an accumulation of material between the blades, I prefer to make the bodies and their extensions concave and arranged with their concave sides together, as shown, thereby providing a hollow interior to receive loose material and from which it will readily drop or may easily be removed. Between the inwardly curved edge portions, the body members 11 and 12 are flattened, presenting plane surfaces, and are in spaced parallel relation. Half round wedging blocks 18' are driven into the handles, as shown in Fig. 6, to secure the handles in place. The rearward extensions or shanks 13 and 14 project at an angle to the respective body members 11 and 12, so that the handles 15 and 16 are offset outward from the body members, to provide clearance of the hedge for the handles and the hands of the user.

In order to provide a sufficient range of movement of the teeth, the pivot pin 19 is disposed adjacent to the rear ends of the body members 11 and 12, and to limit the oscillatory movement of the members about the pivot and at the same time to clamp the front ends of the body members together so as to hold the cutting teeth 17 and 18 in cutting relation to each other, a movement-limiting means combined with a yieldable clamping device are provided in front of the pivot 19, between the pivot pin 19 and the beginning of the cutting teeth or blades and shown as adjacent to the latter. These means include a screw forming an abutment stud 20, which is carried by the body member 12, and extends upwardly therefrom through an arcuate slot 21 formed in the upper body member 11 concentrically with the pivot 19.

A clamping nut 22 at the upper end of the screw 20 draws the two body members together. To make this clamping action a yielding one, a spring washer 23 is disposed between the nut 22 and the upper body member 11. The spring action of the centrally spaced concave body members 11 and 12 is also utilized to press the cutting edges of the fingers or blades 17 and 18 resiliently together. The slot 21 is of such length as to permit sufficient relative movement between the two body members for a shearing action, the range of movement being such that each tooth on the upper body member 11 coöperates with two teeth on the lower body member, and so that each tooth or blade 17 will stop opposite a tooth or blade 18, to form therewith a tapered finger which will readily separate and enter between the branches or stems of the hedge. It is to be noted that the blades 17 and 18 project radially of the pivot pin 19. That the cutter may pass over the hedge without catching, the lower face of the cutter is made smooth and for this purpose the heads of the screws 19 and 20 are made flush with the bottom face of the body member 12. To effect this and also to provide adequate bearing surfaces for the pins or screws 19 and 20, the sockets of the body members are sunken in or depressed about the screw holes so as to provide countersunk bearing portions in which the tapered heads and adjacent portions of the screws may fit substantially flush with the bottom as shown, the depressed annular surfaces surrounding and forming bearing surfaces for the screw pins 19 and 20. The upper body member 11 is also preferably depressed about the pivot screw 19 to form a bearing socket for the pivot screw, and this socket is covered by the washer plate 24, which is secured in place by the nut 25 on the pivot screw 19.

With my construction of cutter, the teeth may be readily and easily clamped together and this clamping action adjusted, and my improved cutter is advantageous in leverage and in convenience of operation. The coöperating cutting edges of the teeth are the outer marginal scalloped edges and are at the junction of an outer face and a cutting face or shearing face arranged at an acute angle to each other. To make these cutting edges self-sharpening, I harden the outer surface of the teeth more than the inner surface. In view of the fact that each of the blades or teeth 17 and 18 consists of a single thickness of steel of homogeneous structure throughout except as to the hardening at one side, it is accordingly evident that these teeth will be hardest at the outside surface and will become gradually softer inward therefrom toward the inner side. As illustrated in Fig. 5, the outer portions 26 of the opposed or cutting faces of the teeth 17 and 18 are hardened to a greater extent than the inner portions 27, with the result that, by reason of the rubbing together or rubbing contact of the cutting faces, the inner parts of these opposed cutting faces will wear down more rapidly than the outer parts and the acuteness of the angle will thereby be maintained or accentuated and the teeth thereby rendered self-sharpening.

It is obvious that various modifications may be made in the construction shown in the drawings and above particularly described within the principle and scope of my invention.

I claim:

1. A hedge cutter comprising, in combination, two coöperating concave members arranged with their concave sides adjacent, the central portions of these members being flattened to present plane surfaces and being in parallel relation, a pivot pin passing through the flattened parallel portions and pivoting together the two members, the members in their flattened portions having pivot holes for the pivot pin, the margins around the pivot holes being depressed and turned inward around the pivot pin so that the depressed annular surfaces form annular bearing surfaces for the pivot pin, the members being provided with a plurality of coöperating concave cutting blades projecting therefrom and arranged with their concave sides adjacent, each of the members being provided with an operating shank, each member and its blades and shank being of a single piece of sheet metal, and means for limiting the relative pivotal movement of the two members.

2. A hedge cutter comprising, in combination, two coöperating concave members arranged with their concave sides adjacent, the central portions of these members being flattened to present plane surfaces and being in parallel relation, a pivot pin passing through the flattened parallel portions and pivoting together the two members, the members in their flattened portions having pivot holes for the pivot pin, the margins around the pivot holes being depressed and turned inward around the pivot pin so that the depressed annular surfaces form annular bearing surfaces for the pivot pin, the members being provided with a plurality of coöperating concave cutting blades projecting therefrom and arranged with their concave sides adjacent, each of the members being provided with an operating shank, each member and its blades and shank being of a single piece of sheet metal, the upper member in its flat portion adjacent to the blades having therein a limiting slot, an abutment stud carried by the lower member and projecting through the limiting slot, the lower member having a socket hole therein for the abutment stud, the margin around the socket being depressed and turned inward around the abutment stud so that the depressed annular surface gives firm support to the abutment stud, and adjustable yielding means carried by the free end of the abutment stud for yieldingly and adjustably pressing the coöperating blades into coöperating relation.

3. A hedge cutter comprising, in combination, a steel cutting blade and a member adjacent thereto and coöperating therewith, the blade having a cutting edge coöperating with such member by shearing action and the blade at its cutting edge being harder at one side and becoming gradually softer toward its other side and having its softer side adjacent to such member so that rubbing contact with such member will progressively bear away the softer portions of the blade more rapidly than the harder portions to offset the wear upon the cutting edge due to the cutting operation and keep the cutting edge sharp.

4. A hedge cutter comprising, in combination, two coöperating steel cutting blades arranged with sides adjacent for shearing action and having coöperating cutting edges, the blades at their cutting edges being harder at their outer sides and becoming gradually softer toward their inner adjacent sides so that the rubbing together of the blades will progressively wear away the softer portions of the blades more rapidly than the harder portions and thereby keep the cutting edges sharp.

5. A hedge cutter comprising, in combination, a concave steel cutting blade and a coöperating member adjacent to the concave side of the blade, the blade having a shearing face in rubbing contact with such member and joining the outer face of the blade at an angle to form a cutting edge, the blade being harder adjacent to the shearing face at its outer side and becoming gradually softer inward therefrom toward its inner concave side so that the rubbing contact with such member will progressively wear away the softer portions of the blade more rapidly than the harder portions to keep the cutting edge of the blade sharp.

6. A hedge cutter comprising, in combination, two coöperating concave steel cutting blades arranged with their concave sides adjacent and having coöperating shearing faces in rubbing contact, the blades being harder adjacent to the shearing faces at the outside of the blades and becoming gradually softer inward therefrom toward the inner concave sides of the blades.

In testimony whereof I have affixed my signature in presence of two witnesses.

HERBERT E. MARSHALL.

Witnesses:
   Victor D. Borst,
   Bernard Cowen.